(12) United States Patent
Písařík et al.

(10) Patent No.: US 9,086,549 B2
(45) Date of Patent: Jul. 21, 2015

(54) PLUG-IN DEVICE FOR CONNECTING OPTICAL AND/OR ELECTRONIC CONNECTORS AND THE METHOD FOR THIS CONNECTING

(71) Applicant: SQS Vláknová Optika a.s, Nová Paka (CZ)

(72) Inventors: Michael Písařík, Jilové u Prahy (CZ); Ilja Kopáček, Jičín (CZ); Luděk Černík, Nová Paka (CZ)

(73) Assignee: SQS Vláknová Optika a.s., Nová Paka (CZ)

( * ) Notice: Subject to any disclaimer, the term of this patent is extended or adjusted under 35 U.S.C. 154(b) by 0 days.

(21) Appl. No.: 14/295,796

(22) Filed: Jun. 4, 2014

(65) Prior Publication Data

US 2014/0376864 A1    Dec. 25, 2014

(51) Int. Cl.
*G02B 6/36* (2006.01)
*G02B 6/38* (2006.01)

(52) U.S. Cl.
CPC ............ *G02B 6/3893* (2013.01); *G02B 6/3879* (2013.01); *G02B 6/3897* (2013.01)

(58) Field of Classification Search
CPC .. G02B 6/3825; G02B 6/3887; G02B 6/3893; G02B 6/3821; G02B 6/3885; G02B 6/36
USPC .................................... 385/76, 77, 78, 80, 84
See application file for complete search history.

(56) References Cited

U.S. PATENT DOCUMENTS

| | | | |
|---|---|---|---|
| 5,190,476 A | 3/1993 | Chaillot | |
| 5,476,390 A | 12/1995 | Taguchi et al. | |
| 6,415,091 B1 | 7/2002 | Daub et al. | |
| 6,445,592 B1 * | 9/2002 | Schirmer | 361/762 |
| 6,851,867 B2 | 2/2005 | Pang et al. | |
| 7,018,227 B2 * | 3/2006 | Takahashi | 439/347 |
| 7,422,457 B1 | 9/2008 | Wu | |
| 7,503,795 B2 | 3/2009 | Yamaji et al. | |
| 8,206,043 B2 | 6/2012 | Thirugnanam et al. | |
| 8,573,998 B2 | 11/2013 | Ichio | |
| 2005/0208806 A1 | 9/2005 | Oila et al. | |

FOREIGN PATENT DOCUMENTS

CN    202678633    1/2013

OTHER PUBLICATIONS

English Abstract of CN 202678633, Jan. 16, 2013.

* cited by examiner

*Primary Examiner* — Jennifer Doan
(74) *Attorney, Agent, or Firm* — Dykema Gossett PLLC

(57) ABSTRACT

The locking insertion mechanism (15) is equipped with thrust components, bumper components, the control lever (1) and with reversibly horizontally sliding mechanism of the locking slider (6) with a safety component for securing the control lever (1) in its secure closed position during the defined insertion of the plug-in component (10) into the guide frame (11) and the previously-defined axial connection of optical and/or electronic connectors (8) in connector casings (9) in their axes. The method for performing the plug-in connecting of the optical and/or electronic connectors (8) into the connector casings (9) is performed in three phases.

10 Claims, 6 Drawing Sheets

Detail A

Figure 1:
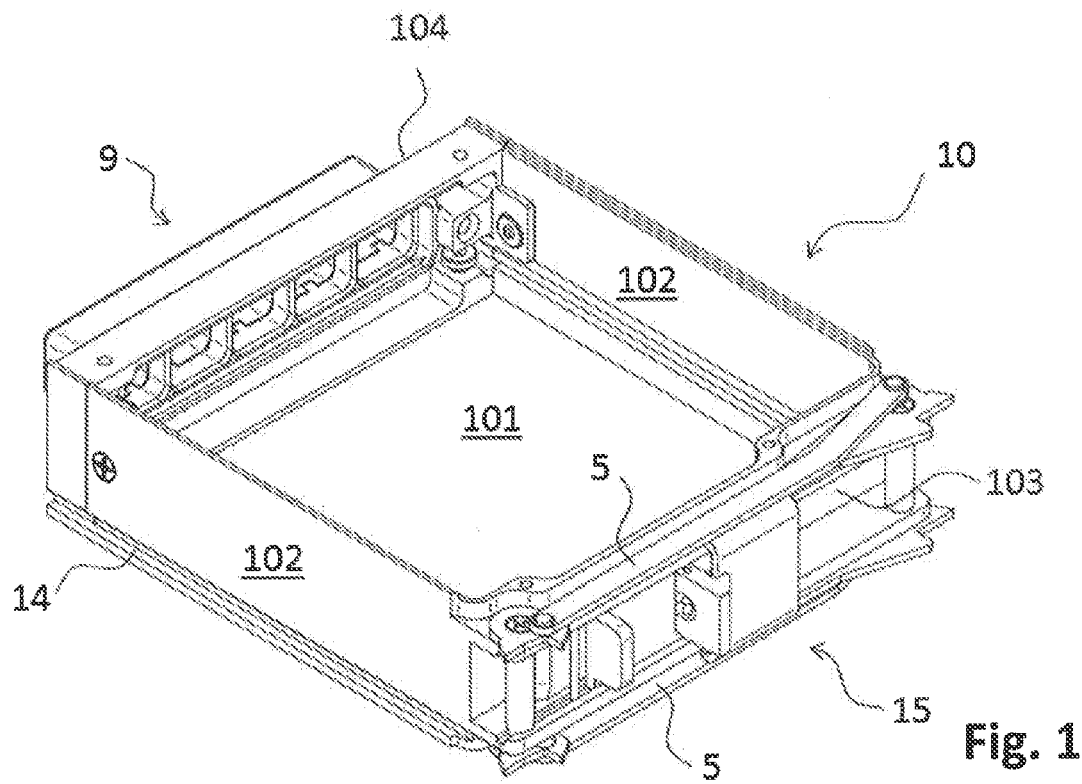

PLUG-IN DEVICE FOR CONNECTING OPTICAL AND/OR ELECTRONIC CONNECTORS AND THE METHOD FOR THIS CONNECTING

TECHNICAL FIELD

The invention concerns a plug-in device for connecting optical and/or electronic connectors in connector casings containing at least one plug-in component, plugged into at least one guide frame, with counter-situated connectors of another plug-in device, firmly connected with the guide frame of the plug-in device. The plug-in component is essentially rectangular and contains a bottom, side walls, a front and back walk, created as a connector casing. The guide frame is essentially rectangular and contains side walls connected at both ends by four horizontally situated side strips. The outer side walls of the plug-in component are equipped with guide grooves/rails that fit the guide rails/grooves on the inner side walls of the guide frame.

The inventions also concern the method of executing this connecting of the optical and/or electronic connectors into connector casings.

BACKGROUND OF THE INVENTION

CZ PV 1999-4307 A3 (published Jun. 14, 2000), corresponding with EP 10 06 383 A1 and with U.S. Pat. No. 6,415,091 B1, applicant/owner SCHROFF GmbH Straubenhardt DE, describes a guiding and holding component. The guiding and holding component is meant for optical waveguides with a groove, with an open frame and with coupling pins, for extension on a bracket of assembly groups and with assembly groups of digital communications technology, which are connected using optical waveguides with other parts and separate components. The bracket of the assembly groups is equipped with a cover plate that has a grid of aeration and de-aeration openings, two side walls and at least one load-bearing rail. The guiding and holding component for assembly groups of digital communication technologies is situated on the bracket of the assembly groups for input and output optical waveguides and it is comprised of two pieces. The guiding and holding component is comprised of a guiding part and a holding part, which are mutually releasably connected by an adjustable plug-in connection, with an advantage in two mutually perpendicular directions.

The strength of this solution is the creation of a fastening component with a guide and holder for optical waveguides, terminated in assembly groups or leading out of them and located on the brackets of the assembly groups. Not only does this component serve to return the optical waveguides to a horizontal and vertical direction while maintaining the minimum permitted turning radii and for their insertion in the holder, but it is also useable during various heights of cover plates.

A disadvantage of this solution is the uncontrollable refracting of optical waveguides, during which equal distribution of the pressure cannot be guaranteed, thus there is a threat of damage to the fronts of the optical waveguides.

CZ PV 1992-415 A3 (published Feb. 19, 1992), priority FR 91/9101820, applicant Francelco. Sursennes F R, describes a plug-in and electric connecting block and the connector for this block. The block is primarily useable in the automotive industry The block contains a casing, the two opposite sides of which are equipped with longitudinal guiding protrusions, limiting parallel grooves. The block also contains flat plates made of insulating material, where each plate is inserted in one of these grooves. Each of the plates contains only one row of parallel passes for fitting contact clips and it has one large space in its front section, cut out for the creation of catches in the sense of threading, so that the catches are created to catch the individual clips by fitting in the openings of those clips. The casing and each of the flat plates contain the appropriate cooperating safety devices, only permitting the full insertion of the plates in one direction. The guiding protrusions occupy the entire depth of the casing so that it leads each plate from the instant it is inserted into the casing in that the catches are narrowing and in that the casing is equipped with a step on one of its large walls for bringing to a stop the first plate's entire catch, which would be raised by the imperfect insertion of this plate's clips, while the step limits the deformation in the bend of the catch.

The used flat plates, when placed by force, when the clips they bear are not perfectly inserted and the catches snapped in, then the inserted plates can press in on the catch or the plate can be bent until it breaks. In these two cases the clip is no longer by one of the inserted plates. The entire catch, lifted by the clip, runs up against the step and slides along it until it rests against the stop, which halts it. The operator is thus warned and is forced to check the clips.

The disadvantage of this construction arrangement is the large angular looseness of the line, which is negatively reflected during the vibrations of single-mode optical waveguides with a low numerical aperture.

Plug-in boxes or plug-in components, used in optical or metallic or electronic systems are passive structural components, used for terminating the lines of connection and distribution networks or for the concurrent reorganisation of these networks into configurations suitable for their appropriate application. The plug-in boxes or plug-in components are equipped, on the back panel, with plugs for plug-in panel optical or metallic connectors, for plugging into the sockets. These sockets are immovably attached in frames, distribution stands, or other mechanical covers and they are equipped on their back panels with pairing connectors in the corresponding plugs.

So far the known and used methods of plugging plug-in boxes or components to sockets are essentially limited to manual manipulation during assembly and they rely on the thoroughness and skill of the operating technicians. In this case, however, it is often objectively difficult to maintain the necessary conditions of mechanic stress on both parts of the enjoined connectors. Apart from the angular deviations that regularly occur when plugging the boxes into the sockets, an especially critical parameter that is difficult to control objectively is the interval of the mutual compression stress of the ferules of the connected plugs and sockets. When inserting too cautiously the connection can be incomplete and imperfect while, on the other hand, inserting with too much force can result in the permitted force being exceeded, leading to permanent damage to the parts of the optical or metallic connectors.

The uncertainty in the knowledge of geometry against the inserted parts in the operating position causes problems. The problem is further complicated by the fact that the optical or metallic connectors are not physically accessible in this application because they are usually situated on the back side of the box, inserted in the sockets. It is not easy to manually secure by tightening or clicking. It can be seen that with the current means of assembly it is not possible to guarantee the proper functionality and position of insertion.

This calls into question the entire application of such devices in heavy climactic conditions such as large changes or ranges of temperatures or and difficult mechanical conditions such as a large range of vibrations that are characteristic of conditions in aeronautics.

SUMMARY OF THE INVENTION

The aforementioned disadvantages are removed or considerably limited in plug-in devices for connecting optical or electronic connectors in connector casings. At least one plug-in component is inserted into at least one guide frame with oppositely-situated connectors of another plug-in device, firmly connected with the guide frame of the plug-in device. The essence of this invention consists of the side walls of the guide frame being equipped with thrust openings for the insertion of the thrust components of the plug-in component, while the entire front wall of the plug-in component is equipped with a locking insertion mechanism, which is equipped with a control lever and safety component for securing it in a closed position.

The main advantage of this invention is the securing of the long-term permanent optimal positioning of the plug-in units for the proper functionality of the connections in the entire range of environmental conditions, because the locking of the connections in the properly inserted position is absolutely categorically imperative for the proper functionality of the operated systems, even if the optical or electronic metallic contacts are not physically accessible, e.g. when they are located on the back side of the plug-in components inserted in the guide frames. The guide frame with thrust openings for the positioning of thrust components of components of the plug-in box ensures the secure insertion and mutual positioning of the plug-in component and guide frame.

It is an advantage that the locking insertion mechanism is equipped on each of its ends, facing out towards the side walls of the plug-in component, with thrust components and bumper components; on one end the control lever for controlling the locking insertion mechanism; and the reversible horizontally sliding mechanism of the locking slider with the safety component for securing the control lever in its secured closed position. The locking insertion mechanism in a suitable arrangement contains two elongated supporting transfer rods, horizontally arranged one over the other, and they are joined at both ends in a vertical shaft through the reversing rotating cams. On one end of the both rods, there are rods connected with vertical shaft, through two revolving reversible cams equipped with thrust components facing out of the locking insertion mechanism and with bumper components turned away from the locking slider, and on the other opposite end of the rods both of the rods are secured through the rotating cams attached to on one of the control levers, equipped with thrust components facing out and bumper components locking sliders turned toward the locking sliders.

In the proper arrangement, the locking slider contains a body that is reversibly sliding situated between both of the rods situated one over the other. A securing component is reversibly attached to the body on the side apparent to the control lever. On the reverse side the body is equipped with a finger grip for easy operation. The reversible horizontally sliding mechanism of the locking slider helps with the secure and controlled guidance, insertion and locking of the plug-in component into the guide frame until the termination of the secure connecting of the appropriate connectors through the control lever and securing component.

For the proper functioning of the control lever the optimal structural arrangement is when the control lever is reversibly elevating due to the front wall of the plug-in component reversibly revolving to the rods of the locking insertion mechanism. The control lever revolves around its axis by rotating.

The locking insertion mechanism, implemented in the sense of the subject of this invention, is designed to satisfy the mechanical and climatic demands under conditions of heavy load, not only for application in aeronautics and astronautics, but also in other similar climatically demanding areas. From a modular perspective, the mechanism is designed so that the forces when closing and securing the optical contacts only act within the mutually relevant pair of the plug-in component and the guide frame.

The locking of the connections in the proper position by insertion, which is aided by the bumper and thrust components at the ends of both rods, secures the functionality of the operated systems in difficult climatic conditions, e.g. in an adverse and changing temperature range, and mechanical conditions, e.g. under a large and fluctuating range of vibrations, which are characteristic of the conditions in aeronautics.

The thrust component, created as a thrust point, simplifies the guiding of the plug-in component to the thrust openings of the guide component.

The bumper component, created as a bumper spike, ensures, in the fully open and half-open position of the locking insertion mechanism's control lever, the halting of the plug-in component en the front edge of the guide frame.

The safety component, created as a holding tooth, represents the optimal structural solution for securing the control lever of the plug-in component in their closed position, thereby completing the insertion process.

The goal of this invention is also the method for performing the plug-in connecting of optical and/or electronic connectors to the connector casings, according to this invention, the essence of which consists of essentially three phases. In the first phase one plug-in component is first inserted and subsequently plugged into one guide frame. During this insertion the outer guide grooves/rails guide the rails/grooves of the plug-in component. During this insertion the outer guiding grooves/rails of the plug-in element are guided the rails/grooves on the inner side walls of the guide frame in the fully open position of the plug-in component's locking insertion mechanism's control lever, until halted by the bumper component, with the benefit of bumper spikes, to the front edge in the guide frame. In the second phase, when the plug-in component's bumper components are halted, with the benefit by using of bumper spikes, situated on the front edge of the guide frame, the locking insertion mechanism's control lever is lowered, during which the thrust component is guided into the proper position, with the benefit by using of the thrust points, for their subsequent insertion info the thrust openings of the guide frame and before the subsequent balanced insertion if the plug-in component into the guide frame. In the third phase, subsequently, the plug-in component's thrust components, with the benefit of the thrust points, enter into the thrust openings of the guide frame, while the plug-in component is uniformly inserted into the guide frame with the use of the rods of the locking insertion mechanism. Meanwhile the previously-defined uniform compression of the connector springs with the ferules in the connector casings occurs with the balanced division of pressure on all of the connectors. The balanced insertion takes place until the instant the control lever is secured in the closed position with the use of the safety component, with the benefit of the holding tooth, of the locking insertion mechanism's locking slider. This results in the previously-defined connection of all the ferules of all the connectors in the plug-in device's connector casings to all the oppositely situated ferules of the other plug-in device's connectors.

The main advantage of method for connecting optical and/or electronic connectors is the long-term constant optimal positioning of the plug-in components in the guide frame for the proper functionality of the connector connections, mechanical guidance and controlled insertion of the fibre plug-in components for optical and metallic systems equipped with panel plug-in connectors into the relevant connector casing stand for the purpose of securing the safe connecting of the relevant connectors while adhering to the permitted limits of mechanical load and the subsequent securing of the proper geometric position of the plug-in component or box in the guide frame or casing. Meanwhile the long-term proper functionality of all the optical and/or metallic connection components and the operational reliability of the equipment is ensured. A large strength is the possibility of the repeated assembly and disassembly required during the entire duration of the operation of this equipment. A large advantage of the invention is the objectively controllable parameter of the interval of the mutual compression stress of the ferules of the connected plug-in components.

The uniqueness of this invention consists in the ingenious mechanism of the plug-in component, which guarantees:

1) The safe and controlled insertion of the plug-in component into the guide frame, during which the subjective influence of the insertion is transferred from the operator to the control lever, thereby eliminating any mistakes caused by a human factor, such as inserting the plug-in component into the guide frame too sharply or strongly;

2) The subsequent balanced insertion of the plug-in component into the guide frame until the moment that the control lever snaps under the holding tooth of the locking slider. When lowering the control lever the thrust points of the plug-in component slide into the thrust openings in the guide frame.

3) The resulting protection against damage to the less visible rear mechanical parts of the guide frame during the use of excessive compressive force on the front side of the plug-in component in that the thrust points of the plug-in component sit on the thrust openings of the guide frame.

DESCRIPTION OF THE FIGURES ON THE DIAGRAMS

Figure 2:
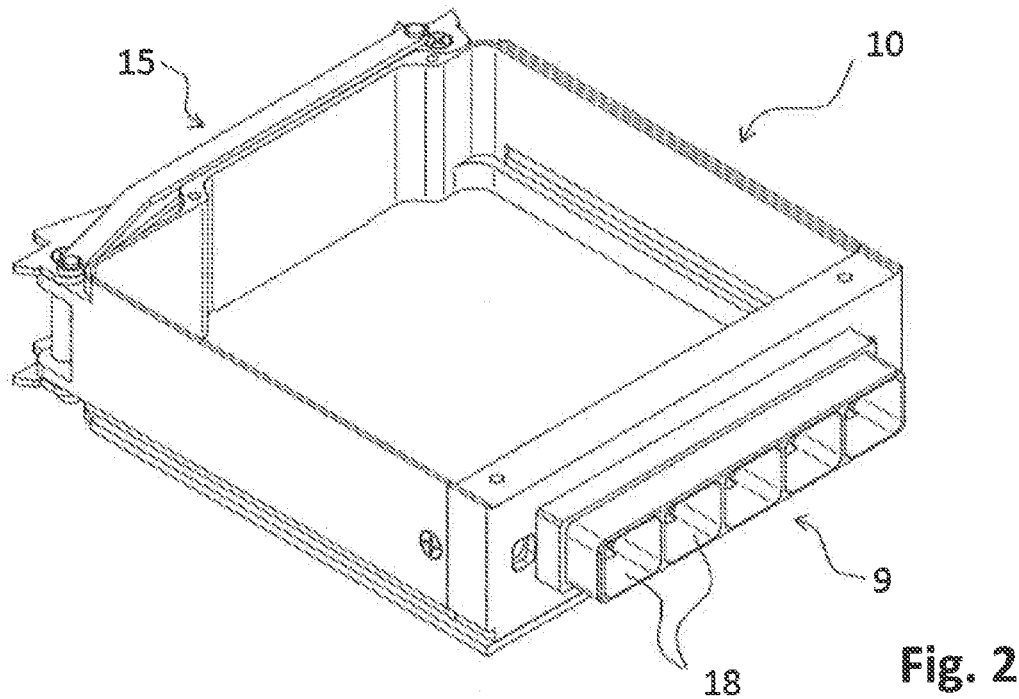
Figure 3:
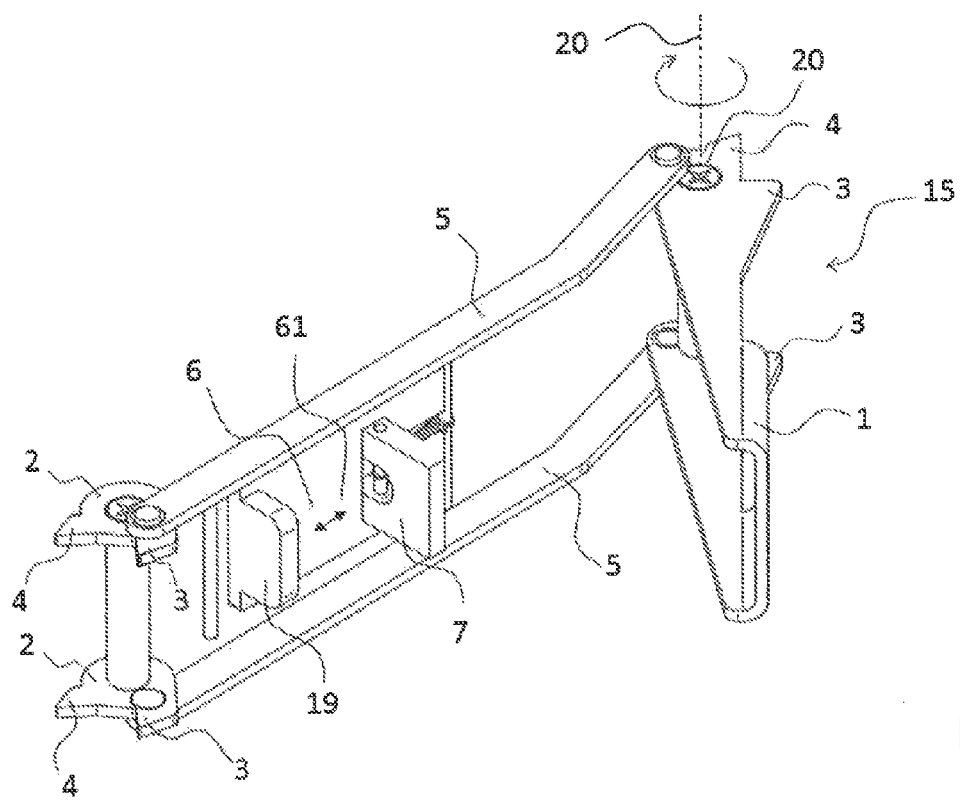
Figure 4:
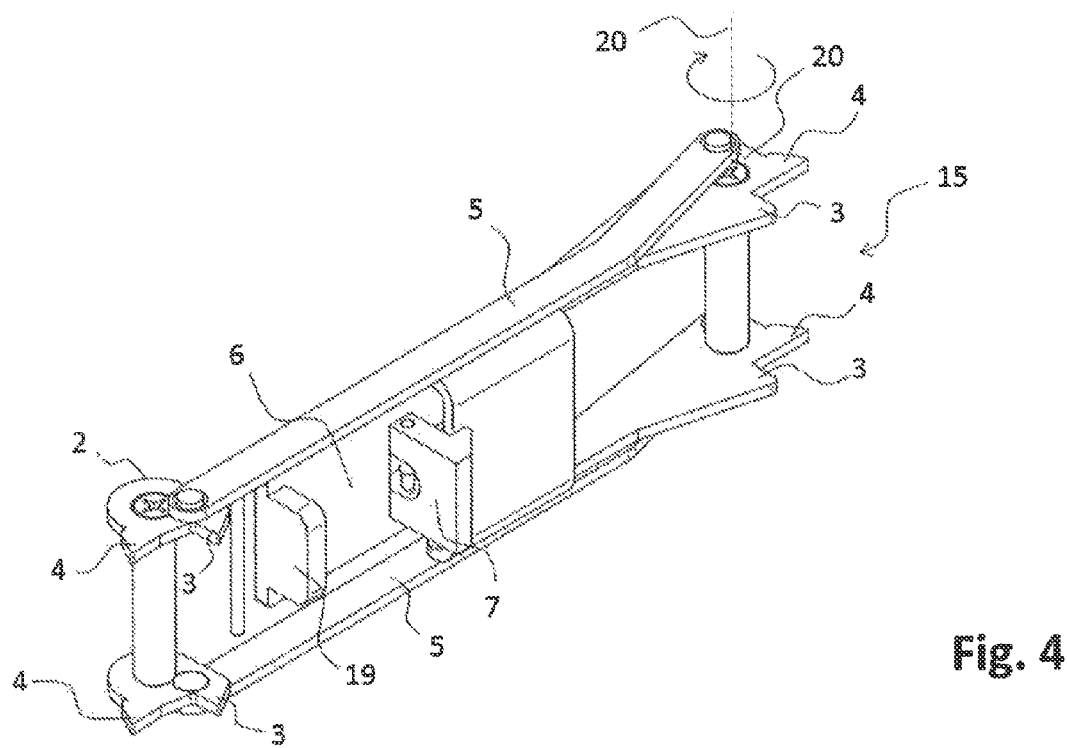
Figure 5:
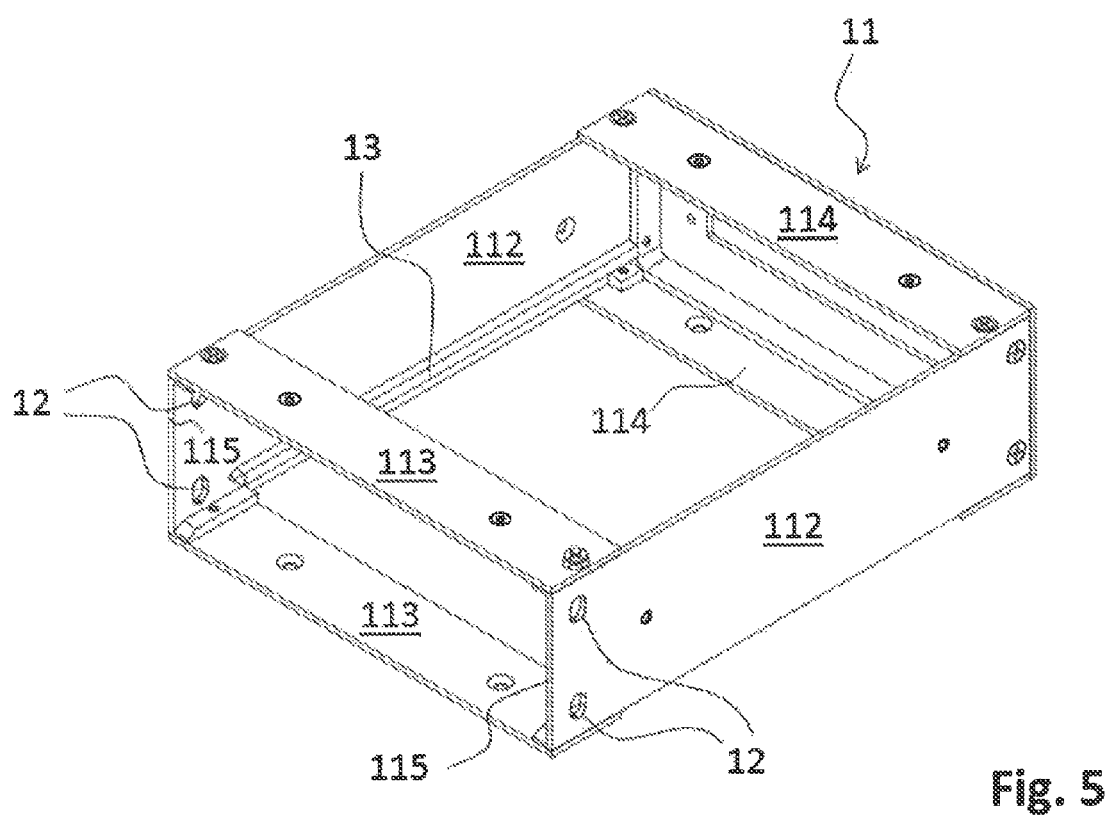
Figure 6:
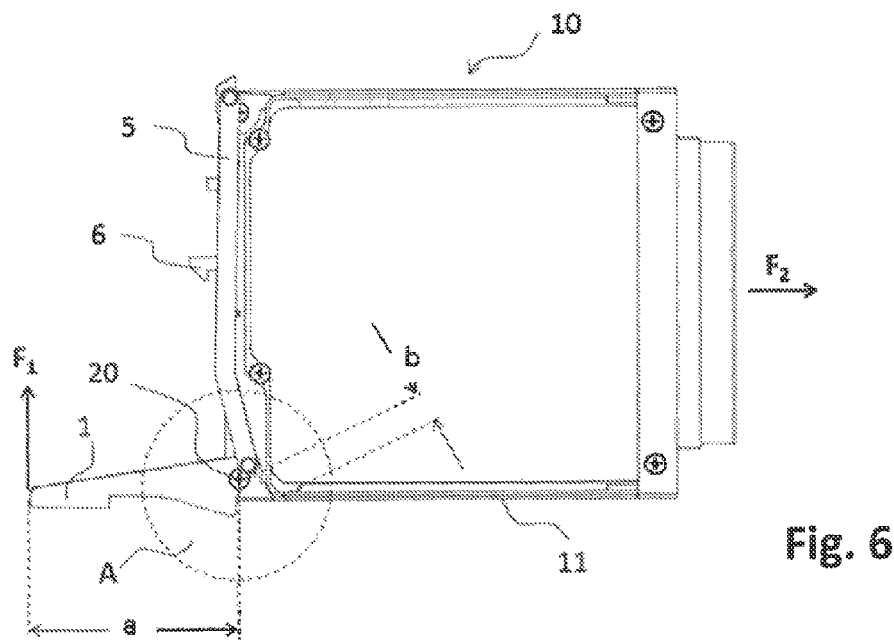
Figure 6A:
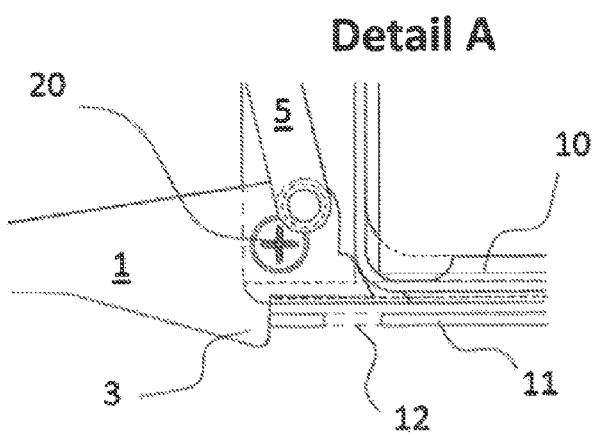
Figure 6B:
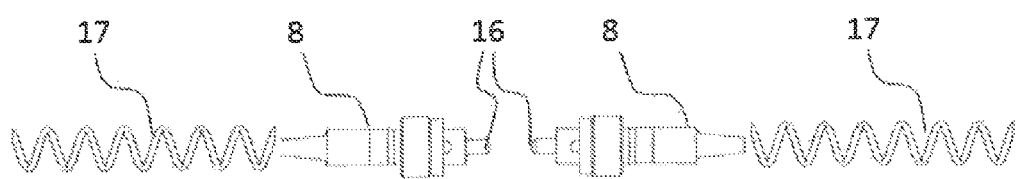
Figure 7:
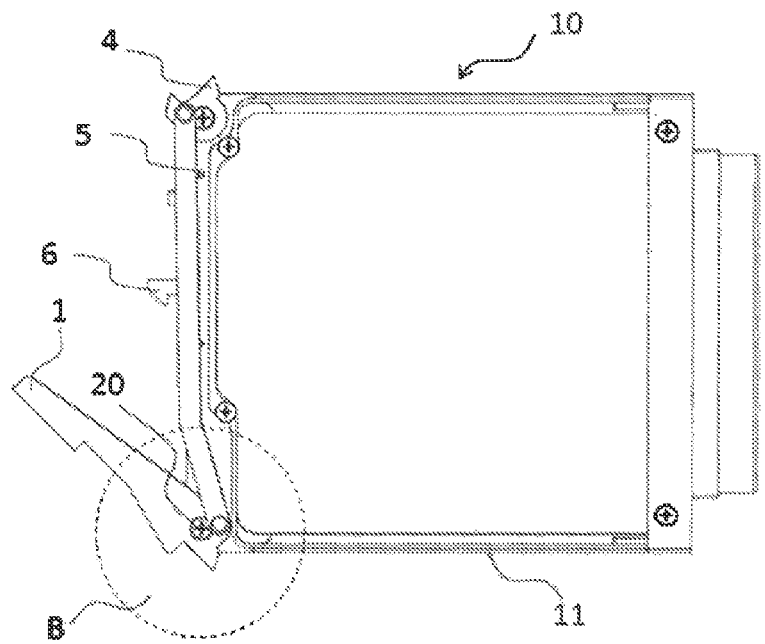
Figure 7A:
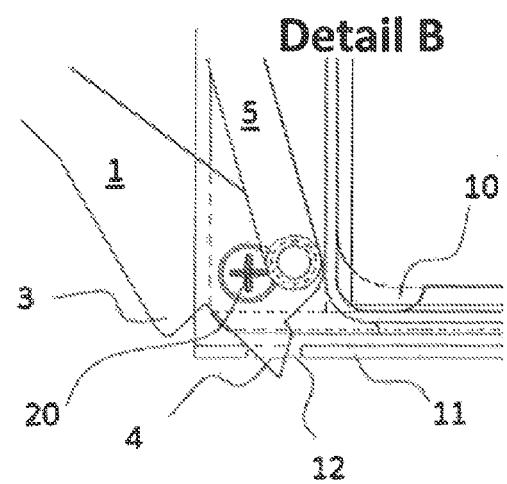
Figure 7B:
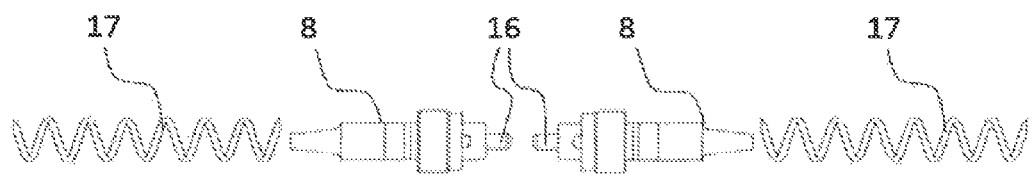
Figure 8:
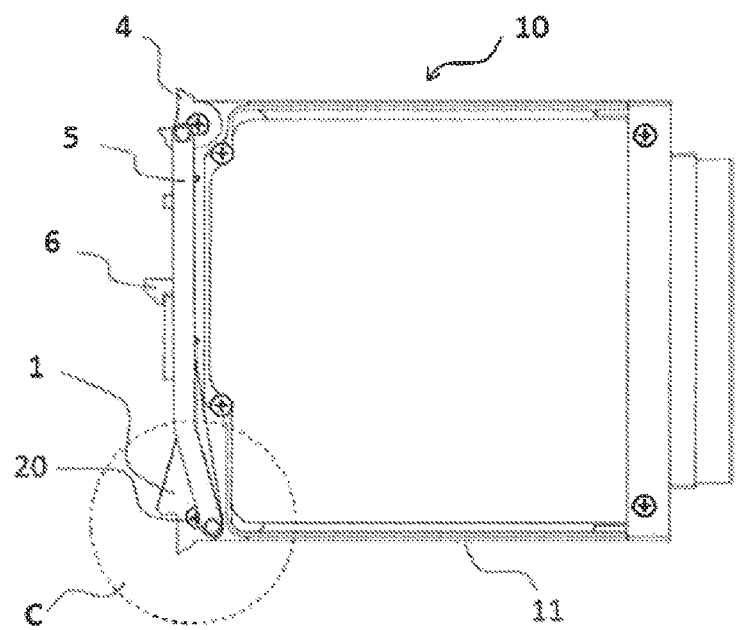
Figure 8A:
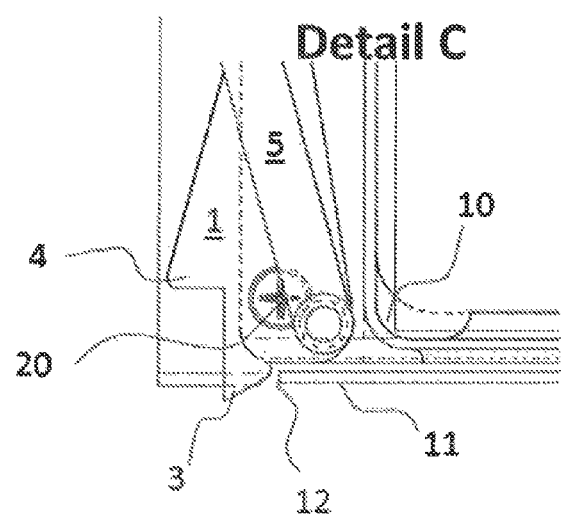

The unrestricted implementation of the invention is described in detail below in the examples of implementing the inventions and explained more closely in the attached drawings, in which FIG. 1 represents the plug-in component in the axonometric side/front view from the side of the locking insertion mechanism, FIG. 2 represents the plug-in component in the axonometric side/rear view from the side of the connector casing, FIG. 3 represents the locking insertion mechanism in the axonometric view and in the open state, FIG. 4 represents the locking insertion mechanism in the axonometric view and in the secure state, FIG. 5 represents the guide frame in the axonometric front view, FIG. 6 represents the plug-in component in the view from above and in the disconnected state, FIG. 6a represents detail A from FIG. 6, FIG. 6b represents the schematic representation of the connector connection in the open state for FIG. 6, FIG. 7 represents the plug-in component with the plug-in frame in the view from above and in the plugged state, FIG. 7a represents detail B from FIG. 7, FIG. 7b represents a schematic representation of the connector connection in the inserted state for FIG. 7, FIG. 8 represents the plug-in component with the plug-in frame in the view from above and in the secure state, FIG. 8a represents detail C from FIG. 8

Figure 8B:
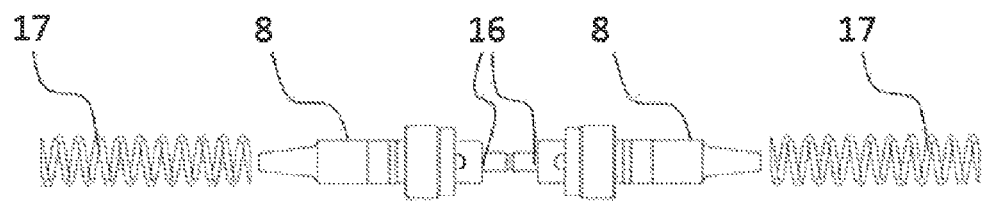

FIG. 8b represents the schematic representation of the connector connection in the secure state for FIG. 8.

EXAMPLES OF IMPLEMENTING THE INVENTION

Example 1

FIGS. 1, 2, 3, 4, 5, 6

The specific exemplary implementation of the plug-in component 10, as a single structural whole, containing further structural components, is illustrated in FIGS. 1 and 2, as specified in greater detail below.

The plug-in component 10 is essentially right-angled and contains a bottom 101, two vertical opposite side walls 102, a front wall and 103 and an opposite back wall 104.

The plug-in component 10 has a back wall 104 created as a connector casing 9. Five openings 18 are created in the connector casing 9 in the example implementation according to FIGS. 1 and 2 for the fitting of optical and/or electronic connectors 8. One connector 8 fits into each opening 18, e.g. a connector 8 of optic fibres. More connectors 8 can also fit in the connector casings 9. Each connector 8 is comprised of a connector body, a ferule 16 of optic fibres and connector springs 17, as illustrated, for example, in FIGS. 7b and 8b. The ferule 18 of optic fibres can have a single fibre or it contain up to 24 optic fibres in a single ferule 16.

As can be seen in FIGS. 1 and 2, each of the side walls 102 of the plug-in component 10 is equipped on the exterior with a guide groove 14. In this specific implementation the groove 14 is situated in the lower part of the side wall 102.

The plug-in component 10 is inserted into the guide frame 11, which in the example implementation is illustrated as a whole in FIG. 5.

The commonly known guide frame 11, essentially a substitute for a socket, is right-angled and contains two opposite, vertical side walls 112 that are, in the example implementation according to FIG. 5, connected on both ends by four horizontally-situated connection plates 113, 114.

The height of the side walls 112 of the guide frame 11 defines the height of the side walls 102 of the plug-in component 10 for inserting the plug-in component 10 into the guide frame 11. The side walls 112 of the guide frame 11 are connected on both ends, with the aid of fastening components, e.g. screws, to four rectangular connection plates 113, 114, upper and lower. The front, upper and lower connection plates 113 are situated at the end of the guide frame 11, turned, after inserting the plug-in component 10, towards the front wall 103 of the plug-in component 10. The rear, upper and lower connection plates 114 are situated in the guide frame 11, at the end, turned, after inserting the plug-in component 10, towards the back wall 104 of the plug-in component 10. The width of these connection plates 113, 114 essentially defines the width for the insertion of the plug-in component 10 into the guide frame 11, i.e. for inserting the front wall 103 and rear wall 104 of the plug-in component 10 into the guide frame 11.

In the implementation according to FIG. 5, the guide frame 1 has the end of both of its side walls 112 turned toward the distance front connection plates 113, equipped by four thrust openings 12, used for fitting four thrust components, in the example implementation, of the thrust points 4 of the locking insertion mechanism 16 of the plug-in component 10. In the example implementation in FIGS. 1, 2 and 5, each of the side walls 112 of the guide frame 11 is equipped on its interior walls in the lower part with rails 13, formed so that they fit on the guide grooves 14 of the plug-in component 10. The opposite groove/rail configuration, not illustrated, is also possible, with the guide grooves 14 arranged on the inner side wall 112 of the guide frame 11 and the rails 13 on the outer side wall 112 of the plug-in component 10.

The locking insertion mechanism 15 with the control lever 1 is affixed to the front wall 103 of the plug-in component 10, as evident in FIGS. 1 and 2. As a whole the locking insertion mechanism 15 of the plug-in component 10 is illustrated in FIGS. 3 and 4. In FIG. 3 the locking insertion mechanism 15 is displayed in the open position of the control lever 1. In FIG. 4 the locking insertion mechanism 15 is displayed in the secure position of the control lever 1 and it is also displayed in this secure position in FIG. 1.

In more detail, the locking insertion mechanism 15 contains two elongated supporting transfer rods 5, an upper and a lower rod 5, arranged horizontally. Both of the rods 5 are located one over the other, on the outer walls of the locking insertion mechanism 15, at a distance essentially corresponding to the height of the front wall 103 of the plug-in component 10. Both of the transfer rods 5 are, on one ends turning away from the control lever 1, connected with the vertical shaft through the reversible revolving cams 2, upper and lower cams 2. Each of these cams 2 controls, in the example implementation, four securing thrust components, specifically two thrust points 4, upper and lower, and two bumper spikes 3, upper and lower. The thrust points 4 are oriented from the outside of the locking insertion mechanism 15 of the plug-in component 10. The bumper spikes 3 are turned toward the locking slider 6.

On the opposite ends both of the rods 5 are attached to one control lever 1. In the example implementation, illustrated in FIGS. 3 and 4, both horizontally situated transfer rods 5 are formed in a rectangular shape. Meanwhile, as is evident from FIGS. 1, 2, 3 and 4, both of these transfer rods 5 are, on the ends turned towards the control lever 1, slightly offset in the direction of the side walls 102 of the plug-in component 10. In the concrete implementation in FIGS. 3 and 4, it simplifies the expanded shape of the control lever 1 the secure and simple manipulation with the control lever 1 and its easy rotation around the axis 20 of rotation. Meanwhile the concrete shape of the expanded control lever 1 illustrated in FIGS. 3 and 4, is a matter of design.

Thus the control lever 1 has a reversible revolving connection to the rods 5 and reversibly elevated to the plug-in component 10. The body of the control lever 1 is, in the example implementation, affixed to the vertical shaft between both of the rods 5. Thus the two horizontally-situated, expanding parts of the control lever 1 upper and lower, which are mutually connected in the example implementation to the vertical connection parts, are located one on top of the other between this shaft and both of the rods 5. Each of the horizontally situated parts of the control lever 1, have, in the example implementation, four securing components on its expanded outer ends, comprised of two thrust and two bumper components. The thrust components are comprised of two thrust points 4, upper and lower, and two bumper spikes 3, upper and lower. The bumper spikes 3 are turned to the locking slider 6.

In the example implementation each expanded part of the control lever 1 is narrowed in the direction of the looking slider 6 in the length securing the shutting of the control lever 1 to the holding tooth 7 of the locking slider 6 in the secure and closed state of the locking insertion mechanism 15.

The actual body 61 of the locking slider mechanism 6 is situated between both of the rods 5, which are situated one over the other. The locking slider 6 is reversibly horizontally sliding in the direction of the plug-in component 10. The holding tooth 7 is reversibly swinging attached to the body 61 of the locking slider 6 on the side facing the control lever 1. On the reverse side the body 61 of the locking slider 6 is equipped with a finger grip 19 for its easy sliding movement. The locking insertion mechanism 15, after fully inserting the plug-in component 10 into the guide frame 11, essentially fills the free rectangular space between both of the side walls 112 and the front connection plates 113 of the guide frame 11, and thus essentially also replaces the missing front wall of the guide frame 11.

The method of performing the connection between the optical and/or electronic connectors 8 and the neighbouring connector casings 9 takes place as follows, essentially in three phases, by inserting the locking insertion mechanism 15 of the plug-in component 10 into the guide frames 11 by the operator.

The first phase consists of the initial insertion and subsequent plugging in of the plug-in component 10 by the operator into the guide frame 11, during which the guide grooves 13 of the plug-in component 10 guide the rails 14 of the guide frame 11 during the fully open position of the control lever 1 of the locking insertion mechanism 15 of the plug-in component 10, until hitting the bumper components, in the specific example of the implementation bumper spikes 3, on the front edge 115 of the guide frame 11.

During the second phase, when the bumper spikes 3 of the plug-in component 10 hit the two vertical front edges 115 of both of the opposite side connection plates 113 of the guide frame it the control lever 1 is lowered and released. This ensures the correct position of the thrust points 4, which in this phase also perform the function of the guiding points, into the thrust openings 12 of the guide frame it before the resulting balanced insertion of the plug-in component 10 into the guide frame 11.

If the operator forgets to put the control lever 1, of the plug-in component 10 into the fully-open position then, when inserting the thrust points 4 of the plug-in component 10, it hits the two vertical front edges 115 of the guide frame 11. This also causes the movement of the control lever 1 of the plug-in component 10 in the direction of closing, though the thrust points 4 of the plug-in component 10 will not be properly inserted into the thrust openings 12 of the guide frame 11 in this case the operator must repeat the entire process with the fully-open control lever 1.

The third phase results in the subsequent balanced insertion of the plug-in component 10 into the guide frame 10. In this phase the operator intentionally presses on the control lever 1 using the finger grip 19 in the direction of the front wall 103 of the plug-in component 10. Meanwhile the insertion of the thrust points 4 of the plug-in component 10 mechanism enters the thrust openings 12 of the guide frame 11. This simultaneously results, through the influence of the rods 5 of the locking insertion mechanism 15 also acting as a traction transfer mechanism, in the balanced insertion of the plug-in component 10 into the guide frame 11, and also in the pre-defined decompression of the ferules 16 of the connectors 8, until the moment when the control lever 1 snaps under the holding tooth 7 of the locking slider 6.

To illustrate, this action is evident in FIGS. 6, 7 and 8 and in detail in FIGS. 6a, 7a and 8a.

The functional state of the connection of the fronts of the ferules 16 of the connectors 8 and the surpassing of the strength of the springs 17 of each connector 8 of the individual actions is schematically clarified in FIGS. 6b, 7b and 8b.

FIGS. 6, 7 and 8 illustrate the view from above of the plug-in component 10 inserted into the guide frame 11.

FIG. 6 shows the state of the plug-in component 10 unplugged from the guide frame 11, while detail A in FIG. 6a shows the state of the locking insertion mechanism 15 and its position towards the thrust openings 12 of the guide frame 11. The plug-in component 10 has the control lever 1 open. The functional state of this unplugging is displayed, in addition to FIG. 3, in FIG. 6b, which schematically shows both connectors 8, containing ferules 16 and pressure connector springs 17. This state is captured at the moment when the bumper spikes 3 of the control lever 1 of the plug-in component 10 are thrust against the outer wall of the guide frame 11.

FIG. 7 shows the state of the plug-in component 10 inserted into the guide frame 11, detail B of which in FIG. 7a shows the state of the locking insertion mechanism 15 and its position towards the thrust opening 12 of the guide frame 11. The plug-in component 10 has the control lever 1 half-closed. The functional state of this insertion is displayed in FIG. 7b, which schematically shows both connectors 8, containing ferules 16 and pressure connector springs 17. This state demonstrates the physical contact of the fronts of the ferules 16 of the opposite connectors 8 and the state of the connector springs 17 in the position of the half-closed control lever 1 of the plug-in component 10. At this moment the thrust points 4 of the plug-in component 10 are guided into the thrust openings 12 of the guide frame 11.

FIG. 8 shows the state of the plug-in component 10 secured in the guide frame 11, whereas detail C in FIG. 8a shows the state of the looking insertion mechanism 18 and its position with regard to the thrust openings 12 of the guide frame 11, where the plug-in component 10 has the closed control lever 1. The functional state of this securing is displayed in FIG. 8b, which schematically shows both of the connected connectors 8, containing ferules 16 and connector springs 17.

The submitted invention enables and resolves the protection against damage to the less-visible rear mechanical parts of the guide frame 11 and the ends of the side walls 112 of the guide frame 11 turned towards them, against any excessive compressive force by the operator. This occurs when the operator is still pushing, or pushed with excessive force, on the front wall 103 of the plug-in component 10 in the phase of final insertion, i.e. after snapping the control lever 1 under the holding tooth 7 of the mechanism of the locking slider 8. This case is eliminated by fitting the four back edges of the thrust points 4 of the plug-in component 10 into the four back edges of the thrust openings 12 of the guide frame 11.

Detail A of FIG. 6 shows the control lever 1 reversibly affixed in the axis 20 of rotation.

To ensure the resulting and final insertion of the control lever 1, of the plug-in component 10 into the guide frame 11 the following equation applies:

$$F_2 = \frac{a \cdot F1}{b}$$

where
$F_2$ is the resulting insertion force,
$F_1$ is the force induced by the operator on the control lever 1,
a is the control lever turning radius 1 and
b is the thrust point turning radius 4.

It ensures from this that the insertion force $F_2$ that operates on the plug-in component 10 into the guide frame 11 is directly proportional to the force placed by the operator on the control lever 1 and the defined ratio of turning radii a, b around the axes 20 of rotation. Radius a represents the distance between the axis 20 of rotation of the control lever 1 and the furthest bumper stop or bumper tooth 3 of the control lever 1. Radius b represents the distance from the axis 20 of rotation of the control lever 1 and the thrust point 4 of the control lever 1.

INDUSTRIAL APPLICABILITY

The solution can be used both in climatically demanding and normal environments for contact connections of optical and/or electronic connectors 8 of plug-in components 10 into guide frames 11.

LIST OF REFERENCE NUMBERS 1 control lever
2 cams
3 bumper spikes
4 thrust points
5 rods 5 of transfer mechanism 15
6 locking slider 6 of rod 5
  61 body 61 of locking slider 6
7 holding tooth 7 of locking slider 6
8 connectors
9 connector casing 9
10 plug-in component
  101 bottom 101 of plug-in component 10
  102 two opposite side walls 102 of plug-in component 10
  103 front wall 103 of plug-in component 10
  104 rear wall 104 of plug-in component 10
11 guide frame
  112 opposite side walls 112 of guide frame 11
  113 front connection plates 113 of guide frame 11
  114 rear connection plates 114 of guide frame 11
  115 vertical edges 115 of side walls 112 of guide frame 11
12 thrust openings 12 for thrust points 4
13 rails
14 grooves
15 locking insertion mechanism 15 of plug-in box 10
16 ferule 16 of optic fibres
17 spring 17 for each connector 8
18 openings 18 for connectors 8
19 finger grip 19 of locking insertion mechanism 15
20 axis 20 of rotation of control lever 1
$F_2$ is the resulting insertion force,
$F_1$ is the force induced by the operator on the control lever 1,
a is the turning radius of the control lever 1 and
b is the turning radius of the thrust point 4.

The invention claimed is:

1. A plug-in device for the connecting of optical and/or electronic connectors (8) in the connector casings (9) with at least one plug-in component (10), inserted into at least one guide frame (11) with oppositely situated connectors (8) of another plug-in device, firmly connected with the guide frame (11) of the plug-in device; where the plug-in component (10) is essentially right-angled, it contains a bottom (101), two vertically facing side walls (102), a front wall (103) and a facing back wall (104) created as a connector casing (9); the guide frame (11) is essentially right-angled and it contains two opposite, vertical side walls (112) mutually connected by horizontal components; and the two facing side walls (102) of the plug-in component (10) are equipped on the outer walls by external guide grooves (14)/rails (13) that fit into the guide rails (13)/grooves (14) on the inner walls of the guide frame (11), wherein
- (a) all of the side walls (112) of the guide frame (11) are equipped with thrust openings (12) for fitting the thrust components of the plug-in component (10), and
- (b) the front wall (103) of the plug-in component (10) is equipped with a locking insertion mechanism (15), which contains a control lever (1) and a safety component for securing the control lever (1) in its closed position during the defined insertion of the plug-in component (10) into the guide frame (11) and the previously-defined axial connection of optical and/or electronic connectors (8) in connector casings (9) in their axes.

2. The equipment according to claim 1, is wherein the locking insertion mechanism (15) is equipped
- with thrust components and bumper components on both of its ends, turning out towards the side walls (102) of the plug-in component (10);
- with a control lever (1) on one end to control the locking insertion mechanism (15); and
- with a reversibly horizontally sliding mechanism of the locking slider (6) with a safety component for securing the control lever (1) in its secure closed position.

3. The equipment according to claim 1, is wherein the control lever (1) of the plug-in component (10) is reversibly elevated due to the front wall (103) of the plug-in component (10) and reversibly revolving to the rods (5) of the locking insertion mechanism (15), and it rotates around its axis (20) of rotation.

4. The equipment according to claim 1, wherein the locking insertion mechanism (15) contains two elongated supporting transfer rods (5), which are horizontally arranged one over the other and on both of its ends are connected with the vertical shaft through the reversible rotating cams (2), while
- on one end of the both rods (5) the cams (2) are equipped with thrust components facing out of the locking mechanism (15) and bumper components turning towards the locking slider (6), and
- on the other opposite end of the rods (5) both of the rods (5) are attached through the revolving cams (2) to one control lever (1), equipped with thrust components facing out and bumper components turning towards the locking slider (6).

5. The equipment according to claim 1, wherein the locking slider (6) includes a body (61), which is reversibly sliding situated between both of the rods (5) situated one over the other, a safety component on the side apparent to the control lever (1) is reversibly swinging attached to the body (61), and on the reverse side the body (61) is equipped with a finger grip (19).

6. The equipment according to claim 1, wherein the thrust component of the plug-in component (10) is created as a thrust point (4).

7. The equipment according to claim 2, wherein the bumper component of the plug-in component (10) is created as a bumper spike (3).

8. The equipment according to claim 1, wherein the safety component of the plug-in component (10) is created as a holding tooth (7).

9. The method of performing the plug-in connecting of the optical and/or electronic connectors (8) into the connector casings (9) of at least one plug-in component (10), inserted into at least one guide frame (11) with oppositely situated connectors (8) of another plug-in device, firmly connected with the guide frame (11) of the plug-in device; where the plug-in component (10) is essentially right-angled, and contains a bottom (101), two vertically facing side walls (102), a front wall (103) and a facing rear wall (104) created as a connector casing (9); and the guide frame (11) is essentially right-angled and contains two vertical facing side walls (112) mutually connected by horizontal components, while the two facing side walls (102) of the plug-in component (10) that are equipped on the outer walls by external guide grooves (14)/rails (13) that fit into the guide rails (13)/grooves (14) on the inner walls of the plug-in component (10), according to claim 1, wherein
- (a) one plug-in component (10) is first guided and subsequently plugged into one guide frame (11), while during this insertion the outer guide grooves (14)/rails (13) of the plug-in component (10) guide the rails (13)/grooves (14) on the inner side walls (112) of the guide frame (11) during the fully open position of the control lever (1) of the locking insertion mechanism (15) of the plug-in component (10), until hitting the bumper components on the front edge (115) of the guide frame (11),
- (b) when the bumper components of the plug-in component (10) hit the front edges (115) of the guide frame (11), the control lever (1) of the locking insertion mechanism (15) is lowered, while the thrust components are simultaneously put in the proper position for their subsequent fitting into the thrust openings (12) of the guide frame and before the subsequent balanced insertion of the plug-in component (10) into the guide frame (11),
- (c) subsequently, the thrust components of the plug-in component (10) enter the thrust openings (12) of the guide frame (11) while the plug-in component (10) is uniformly inserted into the guide frame (11) using the rods (5) of the locking insertion mechanism (15), simultaneously leading to the previously-defined balanced compression of the springs (17) of the connectors (8) with the ferules (16) in the connector casings (9) with uniformly allocated pressure on all the connectors (8), while this balanced insertion takes place until the moment of locking the control lever (1) in the secured position using the safety component of the locking slider (6) of the locking insertion mechanism (15), which leads to the previously-defined connection of all the ferules (16) of all the connectors (8) in the connector casings (9) of the plug-in device to all the oppositely situated ferules (16) of the connectors (8) of the other plug-in device.

10. The method of performing the plug-in connecting of the optical and/or electronic connectors (8) into the connector casings (9) according to claim 9, wherein
- (a) one plug-in component (10) is first guided and subsequently plugged into one guide frame (11), while during this insertion the outer guide grooves (14)/rails (13) of the plug-in component (10) guide the rails (13)/grooves (14) on the inner side walls (112) of the guide frame (11) during the fully open position of the control lever (1) of the locking insertion mechanism (15) of the plug-in component (10), until hitting the bumper spikes (3) on the front edges (115) of the guide frame (11),
- (b) when hitting the bumper spikes (3) of the plug-in component (10) on the front edges (115) of the guide frame (11) the control lever (1) of the locking insertion mechanism (15) is lowered, while the thrust spikes (4) are simultaneously put in the proper position for their subsequent fitting into the thrust openings (12) of the guide frame and before the subsequent balanced insertion of the plug-in component (10) into the guide frame (11),
- (c) subsequently, the thrust points (4) of the plug-in component (10) enter the thrust openings (12) of the guide frame (11) while the plug-in component (10) is uniformly inserted into the guide frame (11) using the rods (5) of the locking insertion mechanism (15), simultaneously leading to the previously-defined balanced compression of the springs (17) of the connectors (8) with the ferules (16) in the connector casings (9) with uniformly allocated pressure on all the connectors (8), while this balanced insertion takes place until the moment the control lever (1) is locking in the secured position using the holding tooth (7) of the locking slider (6) of the locking insertion mechanism (15), which leads to the previously-defined connection of all the ferules (16) of all the connectors (8) in the connector casings (9) of the plug-in device to all the oppositely situated ferules (16) of the connectors (8) of the other plug-in device.

* * * * *

UNITED STATES PATENT AND TRADEMARK OFFICE
CERTIFICATE OF CORRECTION

PATENT NO. : 9,086,549 B2  
APPLICATION NO. : 14/295796  
DATED : July 21, 2015  
INVENTOR(S) : Pisarik et al.

Page 1 of 1

It is certified that error appears in the above-identified patent and that said Letters Patent is hereby corrected as shown below:

On the title page, item (30) Foreign Application Priority Data should read

June 4, 2013 (CZ) ................ PV2013-419

Signed and Sealed this  
First Day of December, 2015

Michelle K. Lee  
*Director of the United States Patent and Trademark Office*